Aug. 17, 1948.　　　H. H. MACKAL　　　2,447,416
AXIALLY ROTATING RECIPROCATING PISTON PUMP
Filed March 26, 1946
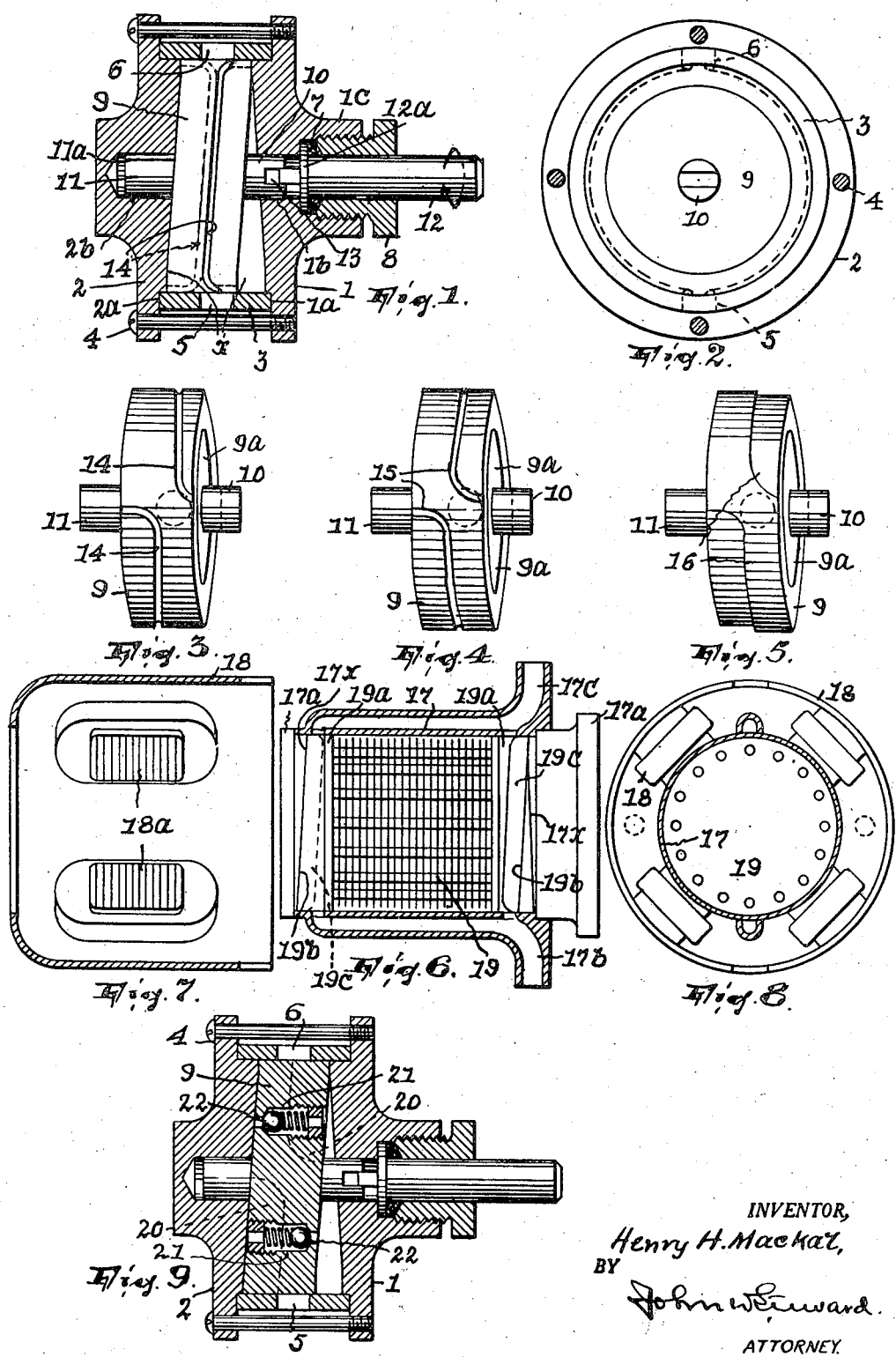
INVENTOR,
Henry H. Mackal,
BY
John W. Steward.
ATTORNEY.

Patented Aug. 17, 1948

2,447,416

UNITED STATES PATENT OFFICE 2,447,416

AXIALLY ROTATING RECIPROCATING PISTON PUMP

Henry H. Mackal, Paramus, N. J.

Application March 26, 1946, Serial No. 657,194

3 Claims. (Cl. 103—157)

This invention relates to apparatus comprising a cylinder and piston and operatively characterized by both rotary and reciprocating motion whereby either flow of fluid is effected, the apparatus then acting as a pump, or fluid-force produces such two kinds of motion, the apparatus acting as an engine. With relation to the axis of rotary motion the piston is pitched or skewed from a plane perpendicular thereto but has all points of its periphery equidistant from such axis so that, whereas the piston appears circular as viewed lengthwise of said axis, as viewed perpendicularly to the angle of pitch it appears elliptical. The cylinder is interiorly cylindrical but viewed radially it has end walls each of whose inner faces diverges from the other and a plane perpendicular to said axis at an angle at least not less than the angle of pitch of the piston, which latter, suitably near and continuously of its periphery, is of uniform thickness, said faces where they most closely adjoin each other being spaced sufficiently to receive the rim or peripheral portion of the piston. If one of the members of the apparatus (cylinder and piston) is rotated the other when confined against rotation therewith must reciprocate, or if one member is reciprocated, the other when confined against reciprocation must rotate. Apparatuses which operate on the above principle are disclosed, for instance, by the patents to Obuch No. 665,970; Dawe, No. 1,229,590; and Schick, No. 1,833,501.

There must of course be provision for intake and exhaust of the fluid and the piston must be devised so as to cooperate with the intake and exhaust in the flow of the fluid, and it is with respect to such functions to be performed that my invention is particularly concerned.

In order to explain the invention I have shown and shall hereinafter describe examples thereof which conceive the apparatus active as a pump, though without the invention being thereby limited.

In the drawing:

Fig. 1 shows the apparatus in section in a plane coincident with the cylinder-and-piston axis;

Fig. 2 is a view looking to the left in Fig. 1 with the right-hand cylinder head removed, certain screws appearing in section;

Fig. 3 is a side elevation of the piston shown in Fig. 1 but displaced 90°;

Figs. 4 and 5 show modified forms of the piston;

Figs. 6 and 7 are longitudinal sectional views of detached portions of a combined motor and pump embodying the invention;

Fig. 8 shows such motor-pump in transverse section, except for the housing and motor-fields, which appear in elevation; and Fig. 9 shows in longitudinal section a modified form of the pump.

In Figs. 1 to 3 the cylinder comprises a pair of discal heads 1 and 2, a cylindrical sleeve or cylinder proper 3 and screws 4 confining these parts together. The heads at their inner margins are rabbeted at 1a and 2a to receive the sleeve and, outwardly of the sleeve, head 1 is penetrated freely by the screws and the other head has them tapped into it. At diametrically opposite points the sleeve has an intake port 5 and an exhaust port 6. A cylinder-space exists between the inner faces of the heads throughout their whole area but they converge, being oppositely pitched but each at the same angle relatively to a plane perpendicular to the axis of the cylinder. The heads provide alined axial bearings 1b and 2b, bearing 1b penetrating head 1, which is formed with an internally threaded extension 1c containing packing 7 and a bushing 8 screwed into the extension.

The piston 9 is a disk having a generally cylindrical periphery of the same diameter as the inner periphery of the sleeve and having its end faces (except as they may be recessed, as at 9a) parallel and pitched to the same angle relatively to the axis of the disk as the inner face of either of the cylinder heads. Its thickness from face to face (at least adjacent its periphery) is the same as the spacing of said faces of the heads where they most closely approximate each other, or as seen in Fig. 1 at the top of the cylinder space. The piston has coaxial with the cylinder oppositely projecting trunnions 10 and 11 respectively journaled in the bearings 1b–2b. At 12 is a spindle for driving the piston, having a spline connection therewith at 13 and a collar 12a outwardly abutted by the packing.

If relative rotation occurs as between the piston and cylinder one will reciprocate lengthwise of the axis of rotation, as the axis of what is in effect an extensible two-part shaft comprising parts 10—12. In the present instance the cylinder is assumed to be fixed against both rotation and reciprocation and the piston assumed to be rotated, as by means acting through the shaft, wherefore the piston reciprocates. Due to such reciprocation, with incidental wabbling of the disk or piston proper, working spaces are alternately developed and reduced substantially to nil, one at one side and the other at the opposite side of the piston proper, as at x, the development of either taking place simultaneously with the reducing of the other during each half-revolution.

As for the construction of the piston so that it will cooperate with the intake and exhaust ports in the flow of the fluid: Two grooves 14, serving as transmission ports, are formed in diametrically opposite segments of the piston's periphery, each extending generally circumferentially thereof, here through nearly one-half thereof, one having its terminals diverted toward and exposed at one side face, and the other having its terminals diverted toward and exposed at the other side face, of the piston. (In Figs. 1 to 3 each groove generally coincides with a plane perpendicular to the piston's axis, but in Fig. 4 each groove 15 is parallel to the margins of the piston's periphery.)

Operation: The piston may be rotated in either direction. Assume it is rotated as per the arrow in Fig. 1 and consider the operation with respect to either side of the piston—say the left side: As the piston rotates from the position shown through a half-revolution, with consequent shifting thereof to the right, thus to form a working space $x$ at its left side, the left-hand port 14 undergoes continuous exposure to port 5 and, being then open to said space (in the Figs. 1 to 4 forms, only at the port's trailing end), conveys fluid from port 5 to said space as an incident of vacuum tending to form in the latter. As the piston rotates through the next-half revolution, with consequent shifting thereof to the left to reduce said space, said port now undergoes exposure to port 6 and, being still open to said space, conveys fluid from the latter to port 6 as an incident of the pressure on the fluid which the piston now exerts on the fluid in said space. In short, whereas port 14 is exposed to said space throughout the existence of the latter during each full-revolution of the piston, whenever in any half-revolution it is exposed to one of the ports 5 and 6 it is cut off from the other.

The construction and operation of the form shown in Fig. 5 are substantially the same as in the case of the forms already described except that the transmission or fluid-conducting ports of the piston have the form of rabbets 16 open throughout their lengths at the respective sides of the piston.

In Figs. 6 to 8 the apparatus takes the form of a pump one of whose parts, as the piston, provides the armature and the other the field-including structure of an electric motor. In this example the cylinder comprises two main parts, as shells 17 and 18, shell 17, which provides the cylinder proper of the pump, being internally cylindrical and closed at both ends by heads 17a and having their inner faces 17x oppositely pitched at the same angle relatively to a plane perpendicular to the axis of the cylinder. Such shell has an intake port 17b and an exhaust port 17c for respectively delivering fluid to and conveying it from the cylinder space, to wit, here at longitudinally offset points of the cylinder since each port is in this instance in effect bifurcated, as shown. Shell 18, being a housing to contain motor fields 18a, is open at each end so as to be fitted over shell 17. The piston, generally designated by character 19, consists of a rotary electric motor armature of a standard type except that its heads 19a, which obtain bearings in shell 17, have their outer faces 19b parallel and pitched to the same angle relatively to the piston axis as the inner face 17x of each cylinder head. The heads are here shown formed with transmission ports 19c like those of Fig. 5.

In Fig. 9 a form of pump is shown which is the same as that appearing in Fig. 1 except that the transmission ports 20 are of the kind shown in Fig. 5 and except that the piston is penetrated from one side face to the other by relief ports 21 which are normally closed in relatively opposite directions by spring-pressed check-valves 22. Should the flow from the pump be so opposed, as by stoppage, that continued operation of the pump would result in damage these ports will open to permit by-passing of the fluid.

Desirably, where the piston has a trunnion such as 11 in Fig. 1 which reciprocates in a socket-like bearing, as 2b, in which fluid-leakage from the cylinder space might become entrapped to impede the action of the piston, some expedient for release of such fluid is present, as a port shown afforded by a flat 11a extending throughout the length of the trunnion.

The novelty of my invention over what, as has been indicated, is known in this art may be made evident as follows: As for the piston, the same has, open at its periphery throughout their own lengths, what I term "fluid-conducting passages" (here provided at 14 or 15) respectively within diametrically opposite segments of said periphery. One of such passages is isolated from one side but is open, at least at its ends, to the opposite side, and the other of such passages is isolated from the latter side but is open, at least at its ends, to the former side, of the piston. As for the cylinder, the same has, cut by a plane radial thereof and which is coincident with the maximum spacing of its converging inner faces (being the inner faces of its heads 1—2), what I term an intake (being here the port 5 or the terminals of the bifurcated port 17b) of a width in said plane less than such maximum spacing but formed and arranged to be exposed by first one and then the other of said passages during each complete revolution of the piston and such cylinder also has, substantially opposite the intake, what I term an exhaust (being here the single port 6 or the terminals of the bifurcated part 17c) arranged to be exposed first by one and then the other of said passages during each complete revolution of the piston. The piston of course substantially seals off flow past it or from one of said end faces of the cylinder toward the other. Whereas such end faces are preferably and as shown pitched at the same angle, this is not essential, though the parallel sides of the piston should be pitched at an angle not greater than that of the pitch of either such face in order that the piston may undergo complete revolution.

Having thus fully described my invention what I claim is:

1. Apparatus of the class set forth including, in combination, a cylinder and piston rotative one relatively to the other and the cylinder having its inner end faces pitched in opposite directions relatively to the cylinder axis, and the piston being coaxial with the cylinder space and substantially sealing off flow therethrough from one toward the other of such faces and extending and closely fitting between the same where they most closely adjoin each other and having its sides generally parallel and pitched at an angle not greater than that of the pitch of either such face, said piston having, open at its periphery throughout their own lengths, fluid-conducting passages respectively within diametrically opposite segments of said periphery and one of which passages is isolated from one side but is open at least at its ends to the opposite side, and the other of which passages is isolated from the latter side but is open at least at its ends to the former side, of the piston, and the cylinder having, cut by a plane radial thereof and which is coincident with the maximum spacing of the said faces, an intake of a width in said plane less than such maximum spacing but formed and arranged to be exposed by first one and then the other of said passages during each revolution of the piston and said cylinder also having, substantially opposite the intake, an exhaust arranged to be exposed by first one and then the other of said passages during each revolution of the piston.

2. The combination set forth in claim 1 characterized by the cylinder and piston including the one the field and the other the armature of an electric motor.

3. The combination set forth in claim 1 characterized by said piston having ports extending from one to the other of its sides and check-valves in the respective ports normally urged toward the respective sides to close such ports.

HENRY H. MACKAL.

REFERENCES CITED

The following references are of record in the file of this patent:

UNITED STATES PATENTS

| Number | Name | Date |
|---|---|---|
| 197,578 | Weyhe | Nov. 27, 1877 |
| 665,970 | Obuch | Jan. 15, 1901 |
| 1,229,590 | Dawe | June 12, 1917 |
| 1,425,192 | Gase | Aug. 8, 1922 |
| 1,440,891 | Petsche | Jan. 2, 1923 |
| 1,833,501 | Schick | Nov. 24, 1931 |
| 2,222,203 | Manseau | Nov. 19, 1940 |

FOREIGN PATENTS

| Number | Country | Date |
|---|---|---|
| 335,629 | Germany | Apr. 7, 1921 |